Sept. 2, 1924. 1,506,821
A. FLETTNER
STEERING DEVICE
Filed March 25, 1922 2 Sheets-Sheet 1
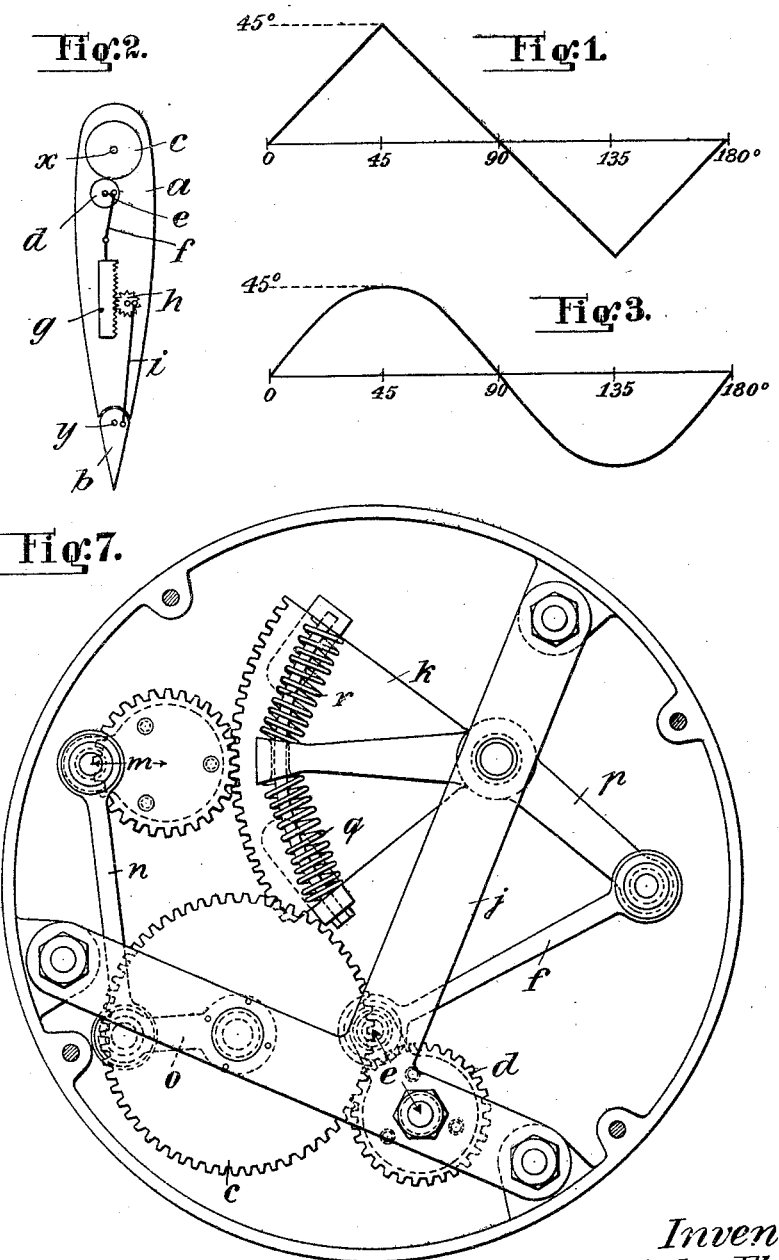
Inventor
Anton Flettner
by [signature]
Attorney.

Sept. 2, 1924.
A. FLETTNER
STEERING DEVICE
Filed March 25, 1922   2 Sheets-Sheet 2
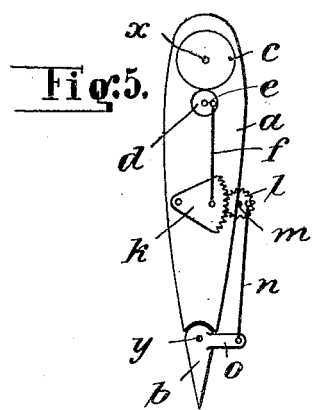
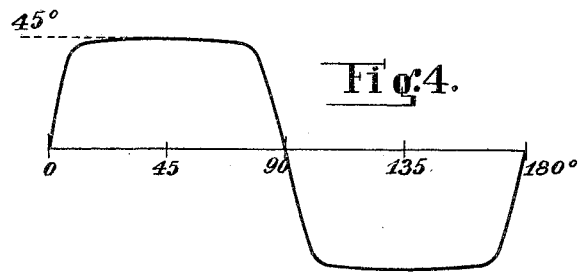
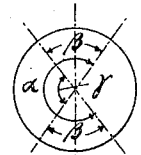
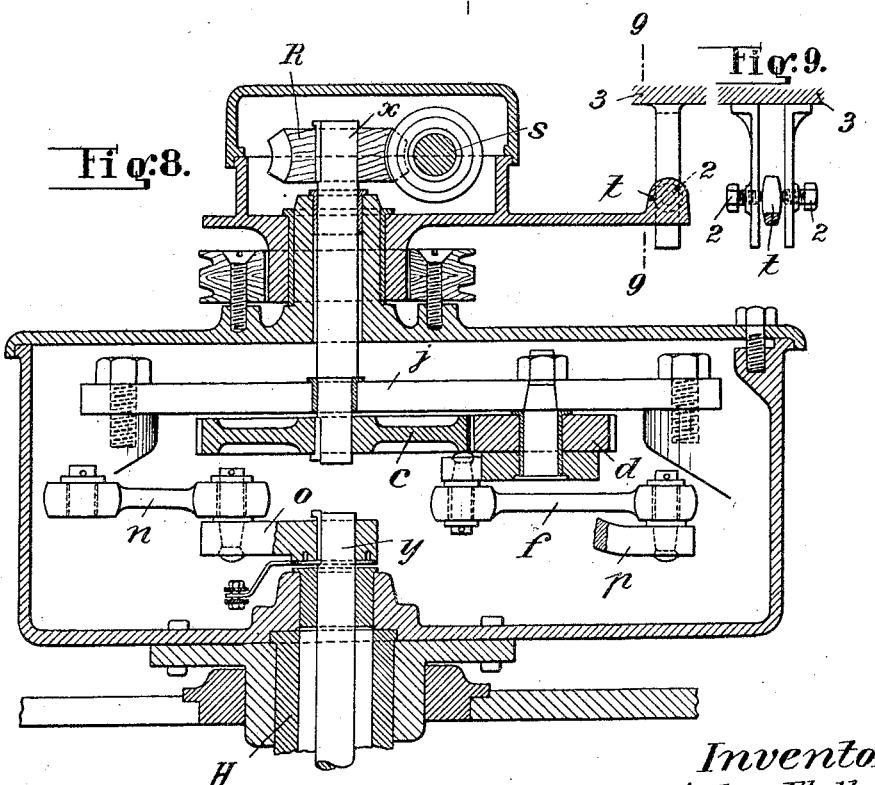
Inventor
Anton Flettner
by *O. Williamson*
Attorney.

Patented Sept. 2, 1924.

1,506,821

UNITED STATES PATENT OFFICE.

ANTON FLETTNER, OF BERLIN, GERMANY.

STEERING DEVICE.

Application filed March 25, 1922. Serial No. 546,839.

*To all whom it may concern:*

Be it known that I, ANTON FLETTNER, a citizen of Germany, residing at Berlin, Germany, have invented certain new and useful Improvements in Steering Devices (for which I have filed an application in Germany on March 30, 1921), of which the following is a specification.

My invention has reference to improvements in steering means for marine and aerial vessels and the like.

In a copending application Serial Number 392,839 I have described means for utilizing an auxiliary rudder for the purpose of turning the main rudder which latter is capable of turning through any angle desired, say 180 or 360°, and in particular I have referred to an arrangement in which the auxiliary rudder is caused to perform an oscillatory or pendulum-like movement, while the main rudder is steadily turned for instance through an angle of 180°. In this prior application and in another copending application Serial Number 533,830 I have described means, which, for the purpose of illustration but not as a limitation, I have designated as a direction governor such means being connected with the main rudder for the purpose of predetermining the position of the auxiliary rudder, and which is ordinarily mounted coaxially with the main rudder or directly upon the spindle thereof, and rotatable in relation thereto, a transmission gearing of even ratio being inserted between the said direction governor and the auxiliary rudder or the last in a series of such auxiliary rudders, so as to enable the auxiliary rudder, immaterially whether the vessel is propelled forwards or backwards to assume the neutral or zero position, whenever the main rudder assumes this position by which means all unintended movements of the main rudder, which may have been caused by the current or the movement of the craft or by other causes, are balanced or counteracted.

In devices of the kind referred to, when the main rudder is turned from its operative position for forward movement, which for the purpose of this specification, I may call the zero position, through an angle of 90° or 180°, which latter would correspond to the operative position for going astern, or through an angle of 270 degrees, it is obvious that the auxiliary rudder should be made to assume a zero position of its own relatively to the positions of the main rudder at the time being. In these four main positions of the steering instrumentalities the auxiliary rudder should, of course, be adapted to perform its full oscillation through an angle of forty-five degrees, in order to be able to rotate the main rudder into its working or operative positions.

In order to attain this object I may provide between the driving mechanism or the direction governor for the main rudder and the auxiliary rudder a transmission gearing by means of which in the case of a uniform turning of the main rudder through an angle of 360°, the angle of deflection of the auxiliary rudder is uniformly varied, so as to cause the auxiliary rudder to assume an angular position of 45°, when the main rudder is at 45° itself, while, when the main rudder is changed to 90°, the auxiliary rudder will be moved back to zero, and upon further rotation of the main rudder to 135°, the auxiliary rudder is swung in the opposite direction through an angle of 45° relatively to the main rudder, while, when the adjustment of the main rudder totals 180°, the auxiliary rudder will again assume its zero position with relation to the main rudder.

On the accompanying drawings which are merely intended as a means of illustrating the principle of my invention without being intended as a limitation of the ambit thereof, I have illustrated conventionally and in a purely diagrammatic manner the principles of adjustment of the auxiliary steering means with relation to the main steering means and with relation to the craft itself.

In the drawings—

Fig. 1 illustrates the relative positions of the two kinds of steering means;

Fig. 2 is a diagrammatic plan view showing one preferred form of operating means.

Fig. 3 is a position curve for the illustration of different ratios of variation of the movement of the two kinds of steering means.

Fig. 4 is another position curve of this kind.

Fig. 5 is a view similar to Fig. 1, and showing a somewhat modified combination of parts for the operation of the steering instrumentalities.

Fig. 6 is a diagram illustrating different relative positions of the two kinds of steering means to be referred to.

Fig. 7 is a plan view of the operating parts.

Fig. 8 is a vertical longitudinal section corresponding to Fig. 7 and

Fig. 9 is a transverse section on the line 9—9 of Fig. 8.

If, in accordance with Fig. 1 of the drawing, the amounts of rotation of the main rudder from zero to 180° are plotted in the position curve as abscissæ, while the oscillations of the auxiliary steering means relatively to the main rudder are plotted as ordinates, the angular connecting line will indicate the ratio of dependence of the oscillation of the auxiliary rudder upon the position of the main rudder. It appears from this diagram that in the case of unintended movements of the main rudder in pursuance of the action of currents, of the movement of the hull or from other unintended or uncontrollable causes, the auxiliary steering means will be caused to perform angular movements equal to the oscillations of the main rudder and in accordance therewith the backward turning movement of the principal steering means is only slowly effected in consequence of the comparatively small angular movements of the auxiliary steering means. On the other hand, the steering movement will likewise take place but slowly, when the auxiliary rudder is to be displaced for the purpose of adjusting or steering the principal steering means.

These drawbacks are avoided in accordance with my invention by providing a transmission gearing between the driving mechanism for the steering means or the direction governor of the principal steering means, and the auxiliary steering means which is so arranged and constructed that the ratio of the angular movements of the principal and of the auxiliary steering means respectively vary according to the particular position of the main steering means or rudder; that is to say, I provide means for a varying ratio of angular transmission of rotary movements.

This variation of the transmission of the angular rotary movement may be accomplished for instance with the aid of means which move the auxiliary rudder in accordance with a sine-law curve while the rotating movement of the driving mechanism or of the direction governor remains uniform. By inserting for instance a crank mechanism or a cam drive or eccentric discs between the driving means for the steering means or the direction governor for the principal rudder and the auxiliary rudder, the uniform continuous movement of the rudder driving mechanism is changed into a discontinuous or irregular pendulum movement of the auxiliary rudder governed by a sine-law.

Fig. 2 illustrates by way of example preferred means of applying the principle just evolved. In the drawing $a$ designates the main rudder, $b$ is the auxiliary rudder, $c$ is the direction governor for the main rudder which is rotatably mounted upon the main rudder spindle and is independently rotatable with relation thereto. At a ratio of doubling the velocity the governor $c$ by suitable gearing rotates a pinion $d$ which, by means of a crank pin $e$ and the pitman rod $f$, operates the rack bar $g$. With a complete uniform revolution of the governor $c$ through 360° the rack bar $g$ operated by the pitman rod $f$ performs twice a double pushing movement and rotates the pinion or toothed wheel $h$ and, through the medium of the coupling rod $i$, the auxiliary rudder $b$ with an angular movement which is governed by a sine-law.

This relation of the two kinds of movement is represented in Fig. 3 of the drawings. While in the arrangement illustrated in Fig. 1 of the drawing the ratio of transmission of the two angular movements is equal to 1:1, the ratio of transmission has now become variable in such a manner that for rotation from the initial operating positions of 0° and 180° the ratio is approximately 1:5, while after having passed through the maximum operating deflections of 45° and 135° the ratio is reduced down to zero.

The relation and interdependence of the two angular movements may be varied at will, so as to effect a corresponding variation of the ratio of transmission by inserting a plurality of cam drives or the like in the transmitting mechanism. By this means it becomes possible in particular to effect a transmission of acceleration of velocity in the zero operating positions in which such acceleration is desirable in view of the requirement of rapid steering and rapid reaction or counter-movement. This is effected by providing a train of transmitting gearings which will produce instead of the sine-curve shown in Fig. 3, a harmonic-curve shaped for instance in accordance with Fig. 4, in which curve the ascending branch of the curve is steeper, while the horizontal or procumbent branch of the curve is flatter than a sine-curve. In the proportion of increase of gradient of the ascending branches of the curve the ratio of transmission of the angular movements becomes larger, and the more quickly will the principal rudder respond in the operating zero positions to the oscillations of the auxiliary rudder and follow its movements both in the steering movement as well as during the reaction. With small oscillations of the auxiliary rudder or of the direction governor the auxiliary rudder is quickly moved into the maximum position of angular operating movement, and remains in this angular position with relation to the main rudder during the continued movements into the maximum operating positions. When upon a reversal of the movement of the craft the principal rudder is changed into the 90° position, the auxiliary rudder is quickly reversed in this position, so that upon the movement of the principal rudder into the new operating position for backward movement of the craft being continued the auxiliary rudder will assume the correct position with relation to the principal rudder, and will properly operate both as regards the steering movement as well as with relation to the reaction or counter-movement.

The realization of the principle of transmission of angular movement as outlined in accordance with Fig. 4 of the drawing may be accomplished by arranging several cam drives or crank gearings in series in such a manner as to produce an addition of their individual movements.

The particular construction of the cam drives or the like is immaterial for the purpose of my invention, it being merely of importance to arrange them in such a manner as to be adapted to convert a uniform rotary movement into an irregular movement. In Fig. 5 I have illustrated diagrammatically and by way of example an arrangement of parts embodying the principle evolved with reference to the curve shown in Fig. 4. The direction governor $c$ drives the pinion $d$ which in its turn operates, by means of the pitman rod $f$, a toothed segment $k$. This cam or crank drive is cooperating with a second drive or crank drive consisting of the pinion $l$, the crank $m$, the pitman rod $n$ and the crank arm $o$, operatively connected to the auxiliary rudder $b$. The crank arms $m$ and $o$ are of different length, so that this eccentric or crank drive mechanism constitutes by itself a means of operation possessing approximately the features of transmission as outlined with reference to Fig. 3 of the drawing. The crank drive first mentioned, and consisting of the crank $e$, the pitman rod $f$ and the rack segment $k$ constitutes an operating mechanism possessing these essential features. Both mechanisms are arranged in series in such a manner as to produce an addition of their individual characteristic movements, that is to say, so as to convert the transmission of movement of Fig. 3 into the movement as outlined in accordance with Fig. 4 of the drawing.

A particularly advantageous form of transmission gearing is obtained by causing the pinion $l$ to move through an angle of more than 180°, the angle $\alpha$ for instance (Fig. 6) at half a revolution of the direction governor and with a full revolution of the crank $e$. For, inasmuch as with an angular movement of this kind as compared with the complete length of movement, the dead centre zones indicated by the letter ($\gamma$) that is to say the zones of comparatively small pushing motion constitute a comparatively large proportion of the entire angular movement, the motion within the effective zones of angles has to be quickly effected so that for the motion in these zones which correspond to the zero operating positions, the transmission for acceleration of velocity must still be increased. Thus by means of the mechanism described, a highly sensitive transmission of movement is effected in the operative positions of the main rudder, that is to say, small variations of the direction governor or of the auxiliary rudder cause a very rapid displacement of the principal rudder, thus providing means of rendering the oscillations of the auxiliary steering means highly efficient. On the other hand, in the other zones of the angular positions of the main rudder there is a very favourable action produced by the forces of the current by the direct transmission through the gearing, and without causing interfering counteracting rotary motion.

In Figs. 7, 8 and 9 of the drawing I have shown by way of example a gearing embodying the features outlined in Fig. 5 of the drawing. The parts corresponding to Fig. 5 are indicated by the same reference characters. The main driving mechanism which for convenience of illustration will be designated as the lower casing in the following specification thereof, is shown in Fig. 7 in plan view and in Fig. 8 in vertical section.

The upper casing is rotatably arranged with relation to the lower casing and mounted in a suitable bearing, and substantially concentric with relation to the spindle $x$. It is provided with ordinary gearing means $r$, $s$. As shown particularly in Fig. 9 of the drawing, the upper casing is provided with a lateral arm $t$ radially arranged and engaging between two stops 2 which are secured to a stationary point upon the craft, thus for instance a bracket 3, the arm $t$ being thereby retained in position in such a manner, that it is capable of following all movements of the entire system, while being prevented from partaking in any rotation of the lower casing upon the shaft $x$. The lower casing is keyed to the hollow shaft H of the principal rudder (Fig. 8) which is rotatably mounted in the stern of the vessel or the like $z$, in such a manner that the shaft H of the rudder, the spindle $y$ of the auxiliary rudder, and the axis $x$ of the direction governor are all concentrically arranged. Thus, the lower casing will be forced to follow all movements of the main or principal rudder.

The procedure in effecting the steering or the turning of the auxiliary rudder operating shaft $y$ is as follows:

By means of a suitable steering conduit, not shown in the drawing, or by direct means the worm $s$ (Fig. 8) and the worm wheel R mounted upon the shaft $x$, are operated from the shaft $x$. The motion is transmitted into the lower casing, and upon the gear wheel $c$ keyed to the shaft $x$, that is to say upon the governor. From the member $c$ motion is transmitted in the manner described, and illustrated with reference to the diagram of Fig. 5, the parts $e$, $m$ and $o$ operating in a similar manner to the pinion $d$ on which is eccentrically arranged the crank pin $e$ which by means of the pitman $f$ is linked to the crank $p$ shaped as a double-armed or bell crank lever, and the free end of which enters between the springs $r$ and $q$ of the segment $k$. Thus, any excessive, and possibly injurious direct or indirect strains upon the lever $p$ may be resiliently compensated. From the segment $k$ the gear wheel $m$ is operated which is adapted for operating the pitman rod $n$ by means of a crank mounted upon the wheel $m$. The pitman rod $n$ operates the crank $o$ which in its turn rotates the downwardly extending shaft $y$ for the operation of the auxiliary rudder.

$j$ in the drawings indicates a bracket or web for the journaling of the several operating parts in the interior of the lower casing. The point from which the lever $p$ operates upon the toothed segment $k$ is situated outside of said segment. The various forces are resiliently transmitted to the segment so as to cause any sudden thrusts and irregular movements caused by the currents to be compensated by the springs $q$ and $r$, without interfering with the operation of the operating gear. The modification described differs from the arrangement indicated conventionally in Fig. 5 of the drawing merely by the fact that the movement of the crank $o$ takes place about the axis of the principal rudder and of the direction governor $c$, the movement being thence transmitted to the auxiliary rudder by means of a parallelogram movement, for instance a crank mechanism or similar instrumentalities.

My invention is applicable to any kind of craft in which currents in a surrounding medium are to be utilized for the steering of the craft propelled therein in any suitable manner, and it is obvious, therefore, that, while my invention is particularly adapted for operation in connection with marine and aerial craft it is equally suitable for operation in connection with other vehicles propelled on solid ground, and having means for the utilization of wind currents or the like. I also wish it to be understood that my invention is not limited to the particular embodiments shown merely by way of example upon the accompanying drawings and described in the specification, but modifications and variations may occur to suit certain conditions and the convenience of the operator, without deviating from the spirit of my invention except as pointed out in the claims.

I wish it to be understood that I do not desire to be limited to the exact details of construction shown and described, for obvious modifications will occur to a person skilled in the art.

I claim:

1. In a steering mechanism in combination, a main rudder, an auxiliary rudder connected with said main rudder, driving means for operating said auxiliary rudder and mechanism inserted between said driving means and said auxiliary rudder for causing said auxiliary rudder to execute pendulumlike movements of varying angular velocity.

2. In a steering mechanism in combination, a main rudder, an auxiliary rudder connected with said main rudder, a direction governor apportioned to said main rudder, driving means for operating said auxiliary rudder and mechanism inserted between said direction governor and said auxiliary rudder for causing said auxiliary rudder to execute pendulumlike movements of varying angular velocity.

3. In a steering mechanism in combination, a main rudder, an auxiliary rudder connected with said main rudder, driving means for operating said auxiliary rudder and mechanism inserted between said driving means and said auxiliary rudder for causing said auxiliary rudder to execute pendulumlike movements varying substantially according to a sine law.

4. In a steering mechanism in combination, a main rudder, an auxiliary rudder connected with said main rudder, a direction governor apportioned to said main rudder, driving means for operating said auxiliary rudder, and mechanism inserted between said direction governor and said auxiliary rudder for causing said auxiliary rudder to execute pendulum like movements varying substantially according to a sine law.

5. In a steering mechanism in combination, a main rudder, an auxiliary rudder connected with said main rudder, driving means for operating said auxiliary rudder and mechanism inserted between said driving means and said auxiliary rudder for causing said auxiliary rudder to execute pendulumlike movements of varying angular velocity, said mechanism being adapted for producing an acceleration of the angular motion of said auxiliary rudder for the small deflections of the main rudder beyond its zero position and a retardation of the angular motion during the maximum deflections of said main rudder.

6. In a steering mechanism in combination, a main rudder, an auxiliary rudder connected with said main rudder, a direction governor apportioned to said main rudder, driving means for operating said auxiliary rudder and mechanism inserted between said direction governor and said auxiliary rudder for causing said auxiliary rudder to execute pendulum-like movements of varying angular velocity said mechanism being adapted for producing an acceleration of the angular motion of said auxiliary rudder for the small deflections of the main rudder beyond its zero position and a retardation of the angular motion during the maximum deflections of said main rudder.

7. In a steering mechanism in combination, a main rudder an auxiliary rudder connected with said main rudder, driving means for operating said auxiliary rudder and mechanism inserted between said driving means and said auxiliary rudder for causing said auxiliary rudder to execute pendulum-like movements of varying angular velocity, said mechanism comprising a plurality of crank gears disposed in series.

8. In a steering mechanism in combination, a main rudder, an auxiliary rudder connected with said main rudder, a direction governor, apportioned to said main rudder, driving means for operating said auxiliary rudder and mechanism inserted between said direction governor and said auxiliary rudder for causing said auxiliary rudder to execute pendulum-like movements of varying angular velocity, said mechanism comprising a plurality of crank gears disposed in series.

9. In a steering mechanism in combination, a main rudder, an auxiliary rudder connected with said main rudder, driving means for operating said auxiliary rudder and mechanism inserted between said driving means and said auxiliary rudder for causing said auxiliary rudder to execute pendulum-like movements of varying angular velocity, said mechanism comprising a plurality of crank gears disposed in series, in such manner as to produce an addition of their characteristic movements.

10. In a steering mechanism in combination, a main rudder, an auxiliary rudder connected with said main rudder, a direction governor apportioned to said main rudder, driving means for operating said auxiliary rudder and mechanism inserted between said direction governor and said auxiliary rudder for causing said auxiliary rudder to execute pendulum-like movements of varying angular velocity in such manner as to produce an addition of their characteristic movements.

11. In a steering mechanism in combination, a main rudder, an auxiliary rudder connected with said main rudder, driving means for operating said auxiliary rudder and mechanism inserted between said driving means and said auxiliary rudder for causing said auxiliary rudder to execute pendulum-like movements of varying angular velocity, said mechanism comprising a plurality of crank gears disposed in series in such manner that on said main rudder executing an angular movement of 180° the first crank will turn through a full circle, while another crank will execute a pendulum motion of more than 180°.

12. In a steering mechanism in combination, a main rudder, an auxiliary rudder connected with said main rudder, a direction governor apportioned to said main rudder, driving means for operating said auxiliary rudder and mechanism inserted between said direction governor and said auxiliary rudder for causing said auxiliary rudder to execute pendulum-like movements of varying angular velocity, said mechanism comprising a plurality of crank gears disposed in series in such manner that on said main rudder executing an angular movement of 180° the first crank will turn through a full circle, while another crank will execute a pendulum motion of more than 180°.

In testimony whereof I affix my signature.

ANTON FLETTNER.